(12) United States Patent
Mori et al.

(10) Patent No.: US 7,449,257 B2
(45) Date of Patent: Nov. 11, 2008

(54) MAGNETIC RECORDING MEDIUM AND PRODUCTION PROCESS THEREFOR

(75) Inventors: Masahiko Mori, Kanagawa (JP); Hiroshi Hashimoto, Kanagawa (JP); Yuichiro Murayama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 440 days.

(21) Appl. No.: 10/969,933

(22) Filed: Oct. 22, 2004

(65) Prior Publication Data

US 2005/0112410 A1 May 26, 2005

(30) Foreign Application Priority Data

Oct. 23, 2003 (JP) ............................. 2003-362804

(51) Int. Cl.
*G11B 5/706* (2006.01)

(52) U.S. Cl. .............. 428/844.8; 428/838; 428/839.4

(58) Field of Classification Search ............... 428/844.8
See application file for complete search history.

(56) References Cited

U.S. PATENT DOCUMENTS

| 4,448,947 | A | * | 5/1984 | Miyake et al. ................. 528/73 |
| 4,842,942 | A | * | 6/1989 | Yatsuka et al. ............ 428/425.9 |
| 5,062,904 | A | * | 11/1991 | Yoden ......................... 148/105 |
| 5,064,720 | A | * | 11/1991 | Kempo et al. ............. 428/423.1 |
| 5,084,341 | A | * | 1/1992 | Hashimoto et al. .......... 428/328 |
| 5,139,866 | A | * | 8/1992 | Araki et al. ................. 428/323 |
| 5,156,908 | A | * | 10/1992 | Araki et al. ................. 428/323 |
| 5,164,239 | A | * | 11/1992 | Ozawa et al. ............. 428/848.7 |
| 5,242,752 | A | * | 9/1993 | Isobe et al. ................. 428/329 |
| 5,478,626 | A | * | 12/1995 | Mori et al. ................... 428/141 |
| 5,480,713 | A | * | 1/1996 | Sasaki et al. ................ 428/323 |
| 5,578,376 | A | * | 11/1996 | Hashimoto et al. ........ 428/425.9 |
| 5,702,821 | A | * | 12/1997 | Murayama et al. ........ 428/425.9 |
| RE36,220 | E | * | 6/1999 | Mori et al. ................ 428/840.2 |
| 5,989,716 | A | * | 11/1999 | Hashimoto et al. ........ 428/425.9 |
| 6,063,500 | A | * | 5/2000 | Kurose et al. ............. 428/425.9 |
| 6,153,295 | A | * | 11/2000 | Nishizawa et al. .......... 428/323 |
| 6,376,083 | B1 | * | 4/2002 | Murayama et al. ........ 428/425.9 |
| 6,475,598 | B1 | * | 11/2002 | Naoe et al. .................. 428/141 |
| 6,677,036 | B2 | * | 1/2004 | Noguchi et al. .......... 428/842.8 |
| 6,686,073 | B2 | * | 2/2004 | Meguro et al. ........... 428/840.5 |
| 6,759,119 | B2 | * | 7/2004 | Murayama et al. ....... 428/840.5 |
| 6,773,788 | B2 | * | 8/2004 | Mori et al. ............... 428/842.8 |
| 6,780,503 | B2 | * | 8/2004 | Noguchi et al. .......... 428/842.8 |
| 6,815,055 | B2 | * | 11/2004 | Matsubaguchi et al. .. 428/840.5 |
| 6,913,818 | B2 | * | 7/2005 | Matsubaguchi et al. ..... 428/323 |
| 7,005,203 | B2 | * | 2/2006 | Matsubaguchi et al. .. 428/839.4 |
| 7,128,989 | B2 | * | 10/2006 | Hashimoto et al. ....... 428/844.5 |
| 2002/0004150 | A1 | * | 1/2002 | Yamada et al. ......... 428/694 TF |
| 2003/0064252 | A1 | * | 4/2003 | Murayama et al. .... 428/694 BS |
| 2003/0108773 | A1 | * | 6/2003 | Matsubaguchi et al. .............. 428/694 BU |
| 2003/0113585 | A1 | * | 6/2003 | Mori et al. ............ 428/694 BH |
| 2003/0138667 | A1 | * | 7/2003 | Hashimoto et al. .... 428/694 BC |
| 2004/0219393 | A1 | * | 11/2004 | Ohno et al. ........... 428/694 BU |
| 2005/0112409 | A1 | * | 5/2005 | Murayama et al. .... 428/694 BA |
| 2005/0112410 | A1 | * | 5/2005 | Mori et al. ............ 428/694 BU |
| 2005/0170190 | A1 | * | 8/2005 | Mori et al. ............... 428/425.9 |

FOREIGN PATENT DOCUMENTS

| JP | 10-330545 A | 12/1998 |
| JP | 2002-329313 A | 11/2002 |

* cited by examiner

*Primary Examiner*—Holly Rickman
*Assistant Examiner*—Gary Harris
(74) *Attorney, Agent, or Firm*—Sughrue Mion, PLLC

(57) ABSTRACT

A magnetic recording medium is provided that includes a non-magnetic support, and at least one magnetic layer provided above the non-magnetic support, the magnetic layer having a ferromagnetic powder dispersed in a binder, all or part of the binder being a polyurethane resin obtained by a reaction of a polyol and a polyisocyanate, the polyurethane resin having a glass transition temperature (Tg) of 70° C. to 200° C., and part of the polyol being a diol having at least one epoxy group and two hydroxyl groups per molecule. There is also provided a process for producing the magnetic recording medium, the process including a step of kneading the ferromagnetic powder and the polyurethane resin.

18 Claims, No Drawings

MAGNETIC RECORDING MEDIUM AND PRODUCTION PROCESS THEREFOR

BACKGROUND OF THE INVENTION

1. Field of the Invention

The present invention relates to a magnetic recording medium comprising, above a non-magnetic support, a magnetic layer comprising a ferromagnetic powder and a binder, or a non-magnetic layer comprising a non-magnetic powder and a binder and a magnetic layer comprising a ferromagnetic powder and a binder in that order. The present invention also relates to a process for producing the magnetic recording medium.

2. Description of the Related Art

Magnetic recording technology is widely used in various fields including video, audio, and computer applications since the technology has excellent characteristics that cannot be achieved by other recording methods; for example, media can be used repeatedly, systems can be built in combination with peripheral equipment due to the ease of conversion of a signal to electronic form, and signals can be corrected easily.

In general, with the demand for higher recording density of magnetic recording media for computer use, etc., it is necessary to yet further improve electromagnetic conversion characteristics, and it is important to make the ferromagnetic powder finer, the surface of the medium ultra smooth, etc.

With regard to finer magnetic substances, a recent magnetic substance employs a ferromagnetic metal powder of 0.1 μm or less or a ferromagnetic hexagonal ferrite powder having a plate size of 40 nm or less. In the case of a multilayer structure in which a magnetic layer is provided as an upper layer above a non-magnetic lower layer provided on the surface of a support, in order to highly disperse in a binder a fine non-magnetic powder used for the non-magnetic layer or the fine magnetic substance, a dispersion technique has been proposed in which the hydrophilic polar group —$SO_3M$ (M denotes a hydrogen atom, an alkali metal, or an ammonium) is introduced into the binder, and the binder chain is adsorbed on the magnetic substance or the non-magnetic powder via the polar group so as to achieve a smooth surface.

For example, a magnetic recording medium employing as binders a polar group-containing acrylic resin and a urethane resin formed from a diol having a cyclic structure and a long alkyl chain has been proposed (ref. JP-A-2002-329313 (JP-A denotes a Japanese unexamined patent application publication)). However, such binders have the problems that, since low molecular weight components are contained therein, the storage stability of the medium cannot be guaranteed, and since the polar groups are sparsely distributed in the polymer chain, there are components containing few polar groups, and adequate dispersibility and electromagnetic conversion characteristics cannot be guaranteed.

In the conventional art, a high strength, high dispersibility polyurethane resin is used as a binder, and a vinyl chloride resin is usually used in combination therewith. A vinyl chloride resin having a polar group is used in order to adjust the viscosity of a coating solution or the physical properties of a tape.

However, when used for recent data media that are required to have high capacity, a high speed, and high reliability, it has been found that a trace amount of hydrochloric acid gas generated from the vinyl chloride resin might not only affect tape storage stability but also cause head corrosion.

In particular, MR (magnetoresistive) heads, which are used in data recording systems for computer use, employ a thin metal film, and there is the problem that the characteristics might be degraded by corrosion. Furthermore, when a tape is stored for a long period of time, hydrochloric acid gas might denature the materials of the tape; for example, a fatty acid formed by hydrolysis of an ester lubricant might migrate onto the surface of the magnetic layer and crystallize. Since the recording density is higher than that of the conventional art, even very small foreign bodies have a large effect.

For these reasons, the combined use of a polyurethane resin and a polyisocyanate curing agent, employing no vinyl chloride resin, has been examined, but since due to its structure the polyurethane can only have an isocyanate-reactive hydroxyl group introduced at the polyurethane chain terminals, the crosslinking performance is degraded and the durability is insufficient compared with a case in which a vinyl chloride resin obtained by copolymerization with a hydroxyl group-containing monomer is used.

Furthermore, a homopolymer of a sulfonic acid (salt) of a diene monomer and a copolymer of a sulfonic acid (salt) of a diene monomer and various types of monomers have been proposed (ref. JP-A-10-330545). However, there are the problems that such a copolymer does not have sufficient solubility in a solvent system used for a coating solution of a magnetic recording medium, the effect thereof on the dispersibility of a fine ferromagnetic metal powder or a non-magnetic lower layer powder used in a coated ultra thin layer magnetic recording medium suitable for recent MR heads is insufficient, and required electromagenetic conversion characteristics and surface smoothness of the medium cannot be guaranteed.

BRIEF SUMMARY OF THE INVENTION

It is an object of the present invention to provide a magnetic recording medium having excellent dispersibility, surface smoothness, and electromagnetic conversion characteristics, the magnetic recording medium further having excellent transport durability and little scraping off of the surface of the magnetic layer or head contamination during repetitive transport when used as a high recording density magnetic recording medium for computer use, causing little corrosion of an MR head, having excellent storage stability at high temperature and high humidity, and having little influence on the environment when incinerated, and it is also an object thereof to provide a process for producing the magnetic recording medium.

These objects of the present invention have been accomplished by the following means.

(1) A magnetic recording medium comprising a non-magnetic support, at least one magnetic layer provided above the non-magnetic support, the magnetic layer comprising a ferromagnetic powder dispersed in a binder, all or part of the binder being a polyurethane resin obtained by a reaction of a polyol and a polyisocyanate, the polyurethane resin having a glass transition temperature (Tg) of 70° C. to 200° C., and part of the polyol being a diol having at least one epoxy group and two hydroxyl groups per molecule, and (2) the magnetic recording medium according to the above (1), wherein the diol is selected from the group consisting of compounds (I) to (VIII) below.

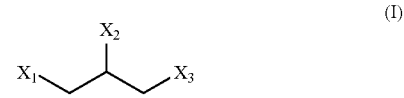

(I)

-continued

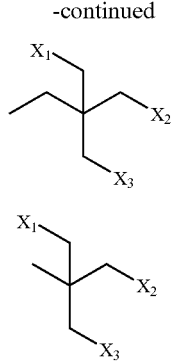

(II)

(III)

In the formulae, among $X_1$, $X_2$, and $X_3$, one thereof is a glycidyl ether group and two thereof are hydroxyl groups.

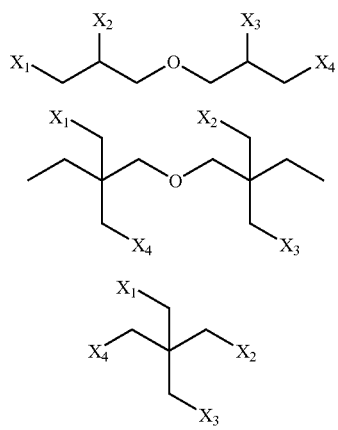

(IV)

(V)

(VI)

In the formulae, among $X_1$ to $X_4$, two thereof are glycidyl ether groups and two thereof are hydroxyl groups.

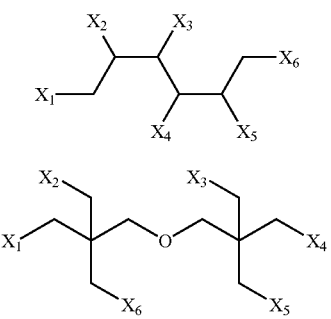

(VII)

(VIII)

In the formulae, among $X_1$ to $X_6$, four thereof are glycidyl ether groups and two thereof are hydroxyl groups.

(3) The magnetic recording medium according to (1) or (2), wherein the medium comprises at least one non-magnetic layer provided between the non-magnetic support and the magnetic layer, the non-magnetic layer comprising a non-magnetic powder dispersed in a binder, all or part of the binder being a polyurethane resin obtained by a reaction of a polyol and a polyisocyanate, the polyurethane resin having a glass transition temperature (Tg) of 70° C. to 200° C., and part of the polyol being a diol having at least one epoxy group and two hydroxyl groups per molecule, (4) a process for producing a magnetic recording medium comprising a non-magnetic support and at least one magnetic layer provided above the non-magnetic support, the magnetic layer comprising a ferromagnetic powder dispersed in a binder, all or part of the binder being a polyurethane resin obtained by a reaction of a polyol and a polyisocyanate, the polyurethane resin having a glass transition temperature (Tg) of 70° C. to 200° C., and part of the polyol being a diol having at least one epoxy group and two hydroxyl groups per molecule, the process comprising a step of kneading the ferromagnetic powder and the polyurethane resin, and (5) the process for producing a magnetic recording medium according to (4), wherein the diol is selected from the group consisting of the above compounds (I) to (VIII).

DETAILED DESCRIPTION OF THE INVENTION

In the present invention, a polyurethane resin that is obtained by a reaction of a polyol and a polyisocyanate, the polyurethane resin having a glass transition temperature (Tg) of 70° C. to 200° C. and part of the polyol being a diol having at least one epoxy group and two hydroxyl groups per molecule, is also called a polyurethane resin (A).

The 'polyisocyanate' referred to here means a compound having two or more isocyanate groups per molecule.

The 'polyol' referred to here means a compound having two or more hydroxyl groups per compound.

In the present invention, a diol having at least one epoxy group and two hydroxyl groups per molecule is also called an 'epoxy-modified diol'.

I. Binder

The magnetic layer of the magnetic recording medium of the present invention comprises, as all or part of the binder, a polyurethane resin (polyurethane resin (A)), which is a polyurethane resin obtained by a reaction of a polyol and a polyisocyanate, the polyurethane resin having a glass transition temperature (Tg) of 70° C. to 200° C., and part of the polyol being a diol having at least one epoxy group and two hydroxyl groups per molecule. It is preferable that all of the binder is the polyurethane resin (A). All of the polyol may be the epoxy-modified diol.

In the polyurethane resin (A) used in the present invention, in order to introduce an epoxy group into the polyurethane chain, the diol having at least one epoxy group and two hydroxyl groups per molecule is reacted, preferably as part of the polyol, with the polyisocyanate. With regard to the polyisocyanate, a diisocyanate, which will be described later, is preferably used.

(Production of Epoxy-modified Diol)

With regard to the above-mentioned epoxy-modified diol used in the present invention, there can be cited an epoxy-modified polyhydric alcohol. The epoxy-modified polyhydric alcohol used in the present invention can be obtained by reacting a tri- or higher-hydric alcohol with an epoxy group-containing compound such as epichlorohydrin or epibromohydrin and then carrying out an elimination reaction.

In order to effect the reaction of the polyhydric alcohol and the epoxy group-containing compound, for example, they are reacted using a Lewis acid catalyst such as boron trifluoride preferably at 50° C. to 75° C. for 5 to 10 hours, thus ring-opening the epoxy group of the epoxy group-containing compound and adding it to an OH group of the polyhydric alcohol.

In the elimination reaction, the reaction product obtained by the reaction between the polyhydric alcohol and the epoxy group-containing compound is reacted using sodium aluminate as a catalyst at 80° C. to 120° C. for 10 to 20 hours, thus eliminating as an acid the halogen atom and the H atom of the OH group formed by the ring-opening of the epoxy group, etc. to form an epoxy group and give an epoxy-modified polyhydric alcohol.

Preferred examples of the polyhydric alcohol include trihydric alcohols such as glycerol, trimethylolethane, and trimethylolpropane, tetrahydric alcohols such as diglycerol, ditrimethylolpropane, and pentaerythritol, and hexahydric alcohols such as sorbitol and dipentaerythritol. Among these, glycerol, diglycerol, or sorbitol can particularly preferably be used.

Specific examples of the epoxy-modified polyhydric alcohol include a sorbitol polyglycidyl ether (product name Denacol EX-611, manufactured by Nagase ChemteX Corporation).

With regard to epoxy-modified diols that can be used in the present invention other than the above-mentioned epoxy-modified polyhydric alcohol, there can be cited as examples epoxidized polydiolefin diols such as an epoxidized polybutadienediol and an epoxidized polypentadienediol. Specific examples of the epoxidized polydiolefin diols include Adeka BF-1000, LPH X-31, LPH X-530, LPH X-2030, LPH X-2100, LPH-2060 (manufactured by Adeka Argus Chemical Co.) and poly bd R45EPI (manufactured by Idemitsu Kosan Co., Ltd.).

With regard to an epoxy resin having two or more hydroxyl groups and two or more epoxy groups per molecule, there can be cited as examples a bisphenol type epoxy resin and a novolac type epoxy resin. Specific examples of the bisphenol type include Epikote 828, 834, 1001, 1002, 1003, 1004, 1007, and 1009 (manufactured by Japan Epoxy Resins Co., Ltd.), and specific examples of the novolac type include phenol novolac type epoxy resins such as Epikote 152 and 154 (manufactured by Japan Epoxy Resins Co., Ltd.), and Sumiepoxy ELPN-180 and ESPN-180 (manufactured by Sumitomo Chemical Co., Ltd.), and cresol novolac type epoxy resins such as Sumiepoxy ESCN220L, 220F, 220HH, ESMN-220L (manufactured by Sumitomo Chemical Co., Ltd.), and EOCN-102, 103, and 104 manufactured by Nippon Kayaku Co., Ltd.

The above-mentioned epoxy group-containing polyol and other polyols and polyisocyanates may be added all at once when starting a reaction or portionwise during a reaction.

The epoxy group content of the polyurethane molecule is preferably $2 \times 10^{-5}$ to $2 \times 10^{-3}$ eq/g, more preferably $2 \times 10^{-5}$ to $1 \times 10^{-3}$ eq/g, and yet more preferably $2 \times 10^{-5}$ to $8 \times 10^{-4}$ eq/g.

It is preferable if the epoxy group content is in such a range, since good dispersibility and storage stability can be obtained.

Furthermore, it is preferable for all the polyurethane molecules to have an epoxy group bonded thereto.

(Polyol and Polyisocyanate)

With regard to the polyisocyanate and the polyol other than the epoxy-modified diol that are used as starting materials for the polyurethane resin (A) in the present invention, long chain diols, short chain diols (also called chain extending agents), and diisocyanate compounds described in detail in the 'Polyurethane Resin Handbook' (Ed. by K. Iwata, 1986, The Nikkan Kogyo Shimbun Ltd.) are preferably used. As the long chain diols, polyester diols, polyether diols, polyetherester diols, polycarbonate diols, polyolefin diols, etc. that have a molecular weight of 500 to 5,000, can be used. The polyurethane resin is called a polyester urethane, a polyether urethane, a polyetherester urethane, a polycarbonate urethane, etc. depending on the type of this long chain polyol.

The polyester diols are obtained by polycondensation of a glycol and an aliphatic dibasic acid such as adipic acid, sebacic acid, or azelaic acid or an aromatic dibasic acid such as isophthalic acid, orthophthalic acid, terephthalic acid, or naphthalenedicarboxylic acid. Examples of the glycol component include ethylene glycol, 1,2-propylene glycol, 1,3-propanediol, 1,4-butanediol, 1,5-pentanediol, 3-methyl-1,5-pentanediol, 1,6-hexanediol, 2,2-dimethyl-1,3-propanediol (neopentyl glycol), 1,8-octanediol, 1,9-nonanediol, cyclohexanediol, cyclohexane dimethanol, and hydrogenated bisphenol A. As the polyester diol, it is also possible to use a polycaprolactonediol, or a polyvalerolactonediol obtained by ring-opening polymerization of a lactone such as ε-caprolactone or γ-valerolactone. From the viewpoint of hydrolysis resistance, it is preferable to use, as the polyester diol, one having a branched side chain, or one obtained from an aromatic or alicyclic starting material.

Examples of the polyether diols include polyethylene glycol, polypropylene glycol, polytetramethylene glycol, and those obtained by addition polymerization of an alkylene oxide such as ethylene oxide or propylene oxide with an aromatic glycol such as bisphenol A, bisphenol S, bisphenol P, or hydrogenated bisphenol A, or an alicyclic diol.

It is also possible to suitably use, as the diol component, a dimer diol described in JP-A-11-96539. The structure of the dimer diol is shown below.

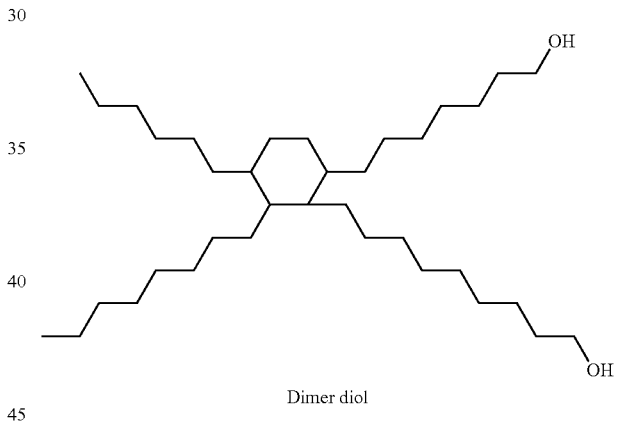

Dimer diol

These long chain diols or the dimer diol may be used singly or in a combination of a plurality of diols.

The short chain diols can be selected from the same compounds as those cited as examples for the glycol component of the polyester diol. Furthermore, the combined use of a small amount of a tri- or higher-hydric alcohol such as trimethylolethane, trimethylolpropane, or pentaerythritol gives a branched polyurethane resin, which improves the curing performance by an isocyanate-based curing agent by decreasing the solution viscosity or increasing the number of terminal hydroxyl groups of the polyurethane.

Specific examples of diisocyanate compounds that can be used include aromatic diisocyanates such as MDI (diphenylmethane diisocyanate), 2,4-TDI (tolylene diisocyanate), 2,6-TDI, 1,5-NDI (naphthalene diisocyanate), TODI (tolidine diisocyanate), p-phenylene diisocyanate, and XDI (xylylene diisocyanate), and aliphatic or alicyclic diisocyanates such as trans-cyclohexane-1,4-diisocyanate, HDI (hexamethylene diisocyanate), IPDI (isophorone diisocyanate), $H_6$XDI (hydrogenated xylylene diisocyanate), and $H_{12}$MDI (hydrogenated diphenylmethane diisocyanate).

The long chain diol/short chain diol/diisocyanate composition of the polyurethane resin (A) is preferably (15 to 80 wt %)/(5 to 40 wt %)/(15 to 50 wt %).

The urethane group content of the polyurethane resin (A) is preferably 1 to 5 meq/g, and more preferably 1.5 to 4.5 meq/g.

It is preferable if the content is in such a range, since a high mechanical strength can be obtained and the dispersibility is improved due to good viscosity.

In order to improve the dispersibility of a magnetic powder or a non-magnetic powder, it is preferable for the polyurethane resin (A) and/or a polyurethane resin that is used in combination therewith to have a functional group (polar group) that is adsorbed on the surface of these powders. Preferred polar groups include —$SO_3M$, —$SO_4M$, —$PO(OM)_2$, —$OPO(OM)_2$, —COOM, >$NSO_3M$, —$NR^1SO_3M$, —$NR^1R^2$, and —$N^+R^1R^2R^3X^-$ (M denotes a hydrogen atom, an alkali metal, or an ammonium. $R^1$, $R^2$, and $R^3$ independently denote a hydrogen atom or an alkyl group. X denotes a monovalent anion, and examples thereof include a halide ion).

Among these, —$SO_3M$ is particularly preferable since excellent dispersibility can be achieved. Two or more types of polar groups may be employed and, for example, —$NR^1R^2$ may be introduced as well as —$SO_3M$.

The polar group content is preferably $1\times10^{-5}$ to $2\times10^{-4}$ eq/g. It is preferable if the content is in this range, since sufficient adsorption on the magnetic powder can be achieved, the solvent solubility is good, and the dispersibility is improved.

Specific examples of the compound for introducing the polar group into the polyurethane resin include an ethylene oxide (2 moles) adduct of sodium sulfoisophthalate (DEIS), which is a polyol.

As well as the functional group for adsorption, it is preferable to introduce into the binder in advance a functional group having an active hydrogen, such as an —OH group, in order to improve coating strength as a result of the formation of a crosslinked structure by reaction with an isocyanate curing agent.

It is preferable to introduce in advance 2 to 20 functional groups per molecule, and more preferably 3 to 15 functional groups. It is preferable if the number of groups is in such a range, since the reactivity with the isocyanate curing agent is good, the coating strength improves, good durability can be obtained, the solvent solubility improves, and good dispersibility can be achieved.

The molecular weight of the binder is preferably 10,000 to 200,000 as a weight-average molecular weight, and more preferably 20,000 to 100,000. It is preferable if it is in such a range, since sufficient coating strength is obtained, the durability improves, and a stable dispersibility is obtained.

With regard to a resin that can be used in combination with the polyurethane resin (A), there can be cited as examples cellulose resins such as nitrocellulose, cellulose acetate, and cellulose propionate, polyvinyl alkylal resins such as polyvinyl acetal and polyvinyl butyral, acrylic resins, phenoxy resins, and polyester resins, which can be used in combination as part of the binder. It is preferable, from the viewpoint of the environment and suppression of corrosion of an MR head, not to use a vinyl chloride resin.

In order to increase the mechanical strength and heat resistance of a coating by crosslinking and curing the binder used in the present invention, it is possible to use a curing agent. A preferred curing agent is a polyisocyanate compound. The polyisocyanate compound used as the curing agent is preferably a tri- or higher-functional polyisocyanate. Specific examples thereof include adduct type polyisocyanate compounds such as a compound in which 3 moles of TDI (tolylene diisocyanate) are added to 1 mole of trimethylolpropane (TMP), a compound in which 3 moles of HDI (hexamethylene diisocyanate) are added to 1 mole of TMP, a compound in which 3 moles of IPDI (isophorone diisocyanate) are added to 1 mole of TMP, and a compound in which 3 moles of XDI (xylylene diisocyanate) are added to 1 mole of TMP. Furthermore, a condensed isocyanurate type trimer of TDI, a condensed isocyanurate type pentamer of TDI, a condensed isocyanurate heptamer of TDI, mixtures thereof, an isocyanurate type condensation product of HDI, an isocyanurate type condensation product of IPDI, and crude MDI can be cited as examples.

Among these, the compound in which 3 moles of TDI are added to 1 mole of TMP, and the isocyanurate type trimer of TDI are preferable.

Specifically, Coronate 3041 (manufactured by Nippon Polyurethane Industry Co., Ltd.) can be used preferably.

Other than the isocyanate-based curing agent, it is also possible to use a curing agent that is cured by radiation such as an electron beam or ultraviolet rays. In this case, a compound having, as a radiation-curable functional group, two or more, and preferably three or more, acryloyl groups or methacryloyl groups per molecule can be used suitably.

II. Magnetic Layer

The ferromagnetic powder used in the magnetic layer of the present invention can be either a ferromagnetic metal powder or a ferromagnetic hexagonal ferrite powder.

(Ferromagnetic Metal Powder)

The ferromagnetic metal powder used in the present invention is not particularly limited as long as Fe is contained as a main component (including an alloy), and a ferromagnetic alloy powder having α-Fe as a main component is preferable. These ferromagnetic metal powders may contain, apart from the designated atom, atoms such as Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, and B. It is preferable for the powder to contain, in addition to α-Fe, at least one chosen from Al, Si, Ca, Y, Ba, La, Nd, Co, Ni, and B, and particularly preferably Co, Al, and Y. More specifically, the Co content is preferably 10 to 40 atom % relative to Fe, the Al content is preferably 2 to 20 atom %, and the Y content is preferably 1 to 15 atom %.

These ferromagnetic metal powders may be treated in advance, prior to dispersion, with a dispersant, a lubricant, a surfactant, an antistatic agent, etc., which will be described later. The ferromagnetic metal powder may contain a small amount of water, a hydroxide, or an oxide.

The water content of the ferromagnetic metal powder is preferably set at 0.01% to 2%. The water content of the ferromagnetic metal powder is preferably optimized according to the type of binder.

The crystallite size is preferably 8 to 20 nm, more preferably 9 to 18 nm, and particularly preferably 10 to 16 nm.

The crystallite size is an average value obtained by the Scherrer method from a half-value width of a diffraction peak obtained using an X-ray diffractometer (RINT2000 series, manufactured by Rigaku Corporation) with a CuKα1 radiation source, a tube voltage of 50 kV, and a tube current of 300 mA.

The length of the major axis of the ferromagnetic metal powder is preferably 10 to 80 nm, more preferably 25 to 75 nm, and yet more preferably 35 to 70 nm.

The specific surface area (hereinafter, $S_{BET}$ means a specific surface area obtained by the BET method) of the ferromagnetic metal powder used in the magnetic layer of the present invention is preferably 30 to 80 m²/g, and more preferably 38 to 70 m²/g. This enables both good surface properties and low noise to be achieved at the same time.

The length of the major axis is determined by the combined use of a method in which a transmission electron microscope photograph is taken and the length of the minor axis and the length of the major axis of the ferromagnetic metal powder are measured directly therefrom, and a method in which a transmission electron microscope photograph is traced by an IBASSI image analyzer (manufactured by Carl Zeiss Inc.) and read off.

The pH of the ferromagnetic metal powder is preferably optimized according to the binder used in combination therewith. The pH is in the range of 4 to 12, and preferably from 7 to 10. The ferromagnetic metal powder may be subjected to a surface treatment with Al, Si, P, or an oxide thereof, if necessary. The amount thereof is usually 0.1 to 10 wt % relative to the ferromagnetic metal powder. The surface treatment can preferably suppress adsorption of a lubricant such as a fatty acid to 100 mg/m² or less. The ferromagnetic metal powder may contain soluble inorganic ions such as Na, Ca, Fe, Ni or Sr ions in some cases, and their presence at 200 ppm or less does not particularly affect the characteristics. Furthermore, the ferromagnetic metal powder used in the present invention preferably has few pores, and the level thereof is preferably 20 vol % or less, and more preferably 5 vol % or less.

The form of the ferromagnetic metal powder may be any of acicular, granular, rice-grain shaped, and tabular as long as the above-mentioned requirements for the particle size are satisfied, but it is particularly preferable to use an acicular ferromagnetic metal powder. In the case of the acicular ferromagnetic metal powder, the acicular ratio is preferably 4 to 12, and more preferably 5 to 12.

The coercive force (Hc) of the ferromagnetic metal powder is preferably 159 to 239 kA/m (2,000 to 3,000 Oe), and more preferably 167 to 231 kA/m (2,100 to 2,900 Oe). The saturation magnetic flux density is preferably 100 to 300 mT (1,000 to 3,000 G), and more preferably 160 to 280 mT (1,600 to 2,800 G). The saturation magnetization ($\sigma s$) is preferably 100 to 170 A·m²/kg (emu/g), and more preferably 100 to 160 A·m²/kg (emu/g).

The SFD (switching field distribution) of the magnetic substance itself is preferably low, and 0.8 or less is preferred. When the SFD is 0.8 or less, the electromagnetic conversion characteristics become good, the output becomes high, the magnetization reversal becomes sharp with a small peak shift, and it is suitable for high-recording-density digital magnetic recording. In order to narrow the Hc distribution, there is a technique of improving the particle distribution of goethite, a technique of using monodispersed $\alpha$-$Fe_2O_3$, and a technique of preventing sintering between particles, etc. in the ferromagnetic metal powder.

The ferromagnetic metal powder can be obtained by a known production method and the following methods can be cited. There are a method in which hydrated iron oxide or iron oxide, on which a sintering prevention treatment has been carried out, is reduced with a reducing gas such as hydrogen to give Fe or Fe—Co particles, a method involving reduction with a composite organic acid salt (mainly an oxalate) and a reducing gas such as hydrogen, a method involving thermolysis of a metal carbonyl compound, a method involving reduction by the addition of a reducing agent such as sodium borohydride, a hypophosphite, or hydrazine to an aqueous solution of a ferromagnetic metal, a method in which a fine powder is obtained by vaporizing a metal in an inert gas at low pressure, etc. The ferromagnetic metal powder thus obtained can be subjected to a known slow oxidation process. A method in which hydrated iron oxide or iron oxide is reduced with a reducing gas such as hydrogen, and an oxide film is formed on the surface thereof by controlling the time and the partial pressure and temperature of an oxygen-containing gas and an inert gas is preferable since there is little loss of magnetization.

(Ferromagnetic Hexagonal Ferrite Powder)

The average plate size of the ferromagnetic hexagonal ferrite powder is preferably 5 to 200 nm. When a magnetoresistive head is used for playback in order to increase the track density, the plate size is preferably 40 nm or smaller, more preferably 5 to 40 nm, so as to reduce noise. If the plate size is in this range, stable magnetization can be expected without the influence of thermal fluctuations, the noise is low, and it is suitable for high density recording.

The tabular ratio (plate size/plate thickness) is preferably 1 to 15, and more preferably 1 to 7. If the tabular ratio is small, high packing in the magnetic layer can be obtained, which is preferable, but if it is too small, sufficient orientation cannot be achieved, and it is therefore preferably at least 1. Furthermore, when the tabular ratio is 15 or less, the noise resulting from inter-particle stacking can be suppressed. The $S_{BET}$ of a powder having a particle size within this range is 10 to 200 m²/g. The specific surface area substantially coincides with the value obtained by calculation using the plate size and the plate thickness.

The plate size and plate thickness distributions are preferably as narrow as possible. Although it is difficult, the distribution can be expressed using a numerical value by randomly measuring 500 particles on a TEM photograph of the particles. The distribution is not a regular distribution in many cases, but the standard deviation calculated with respect to the average size is preferably $\sigma$/average size=0.1 to 2.0. In order to narrow the particle size distribution, the reaction system used for forming the particles is made as homogeneous as possible, and the particles so formed are subjected to a distribution-improving treatment. For example, a method of selectively dissolving ultrafine particles in an acid solution is also known.

The coercive force (Hc) measured for the magnetic substance can be adjusted so as to be on the order of 39.8 to 398 kA/m (500 to 5,000 Oe). A higher Hc is advantageous for high-density recording, but it is restricted by the capacity of the recording head. In the present invention, the Hc of the ferromagnetic hexagonal ferrite powder is on the order of 143 to 238 kA/m (1,800 to 3,000 Oe), and preferably 159 to 223 kA/m (2,000 to 2,800 Oe). When the saturation magnetization of the head exceeds 1.4 T, it is preferably 159 kA/m (2,000 Oe) or higher. The Hc can be controlled by the particle size (plate size, plate thickness), the types and the amount of element included, the element substitution sites, the conditions used for the particle formation reaction, etc.

The saturation magnetization ($\sigma s$) is preferably 40 to 80 A·m²/kg (emu/g). A higher $\sigma s$ is preferable, but there is a tendency for it to become lower when the particles become finer. In order to improve the saturation magnetization ($\sigma s$), making a composite of magnetoplumbite ferrite with spinel ferrite, selecting the types of element included and their amount, etc., are well known. It is also possible to use a W type hexagonal ferrite.

When dispersing the ferromagnetic hexagonal ferrite powder, the surface of the ferromagnetic hexagonal ferrite powder can be treated with a material that is compatible with a dispersing medium and a polymer.

With regard to a surface-treatment agent, an inorganic or organic compound can be used. Representative examples include compounds of Si, Al, P, etc., and various types of silane coupling agents and various types of titanate coupling agents. The amount of the surface-treatment agent added is 0.1% to 10% relative to the ferromagnetic hexagonal ferrite powder. The pH of the ferromagnetic hexagonal ferrite powder is also important for dispersion. It is usually on the order of 4 to 12, and although the optimum value depends on the dispersing medium and the polymer, it is selected from on the order of 6 to 11 from the viewpoints of chemical stability and storage properties of the medium. The moisture contained in the ferromagnetic hexagonal ferrite powder also influences the dispersion. Although the optimum value depends on the dispersing medium and the polymer, it is usually 0.01% to 2.0%.

With regard to a production method for the ferromagnetic hexagonal ferrite powder, there is glass crystallization method (1) in which barium oxide, iron oxide, a metal oxide that replaces iron, and boron oxide, etc. as glass forming materials are mixed so as to give a desired ferrite composition, then melted and rapidly cooled to give an amorphous substance, subsequently reheated, then washed, and ground to give a barium ferrite crystal powder;

hydrothermal reaction method (2) in which a barium ferrite composition metal salt solution is neutralized with an alkali, and after a by-product is removed, it is heated in a liquid phase at 100° C. or higher, then washed, dried and ground to give a barium ferrite crystal powder;

co-precipitation method (3) in which a barium ferrite composition metal salt solution is neutralized with an alkali, and after a by-product is removed, it is dried and treated at 1100° C. or less, and ground to give a barium ferrite crystal powder, etc., but any production method can be used in the present invention.

The magnetic layer of the present invention can contain as necessary carbon black.

Types of carbon black that can be used include furnace black for rubber, thermal black for rubber, black for coloring, and acetylene black. The carbon black used in the magnetic layer should have characteristics that have been optimized as follows according to a desired effect, and the effect can be obtained by the combined use thereof.

The specific surface area of the carbon black is preferably 100 to 500 m$^2$/g, and more preferably 150 to 400 m$^2$/g. The dibutyl phthalate (DBP) oil absorption thereof (hereinafter 'DBP oil absorption' means oil absorption using dibutyl phthalate) is 20 to 400 mL/100 g, and preferably 30 to 200 mL/100 g. The particle size of the carbon black is preferably 5 to 80 nm, more preferably 10 to 50 nm, and yet more preferably 10 to 40 nm. The pH of the carbon black is preferably 2 to 10, the water content thereof is preferably 0.1% to 10%, and the tap density is preferably 0.1 to 1 g/mL.

Specific examples of the carbon black used in the present invention include BLACKPEARLS 2000, 1300, 1000, 900, 800, 880 and 700, and VULCAN XC-72 (manufactured by Cabot Corporation), #3050B, #3150B, #3250B, #3750B, #3950B, #950, #650B, #970B, #850B, MA-600, MA-230, #4000 and #4010 (manufactured by Mitsubishi Chemical Corporation), CONDUCTEX SC, RAVEN 8800, 8000, 7000, 5750, 5250, 3500, 2100, 2000, 1800, 1500, 1255 and 1250 (manufactured by Columbian Carbon Co.), and Ketjen Black EC (manufactured by Akzo Nobel).

The carbon black may be subjected to any of a surface treatment with a dispersant, etc., grafting with a resin, or a partial surface graphitization. The carbon black may also be dispersed in a binder prior to addition to a coating solution. The carbon black that can be used in the present invention can be chosen from, for example, those described in the 'Kabon Burakku Binran (Carbon Black Handbook)' (edited by the Carbon Black Association of Japan, 1995).

The carbon black may be used singly or in a combination of different types thereof. The carbon black is preferably used in an amount of 0.1 to 30 wt % based on the weight of the magnetic substance. The carbon black has the functions of preventing static charging of the magnetic layer, reducing the coefficient of friction, imparting light-shielding properties, and improving the film strength. Such functions vary depending upon the type of carbon black. Accordingly, it is of course possible in the present invention to appropriately choose the type, the amount and the combination of carbon black for the magnetic layer according to the intended purpose on the basis of the above mentioned various properties such as the particle size, the oil absorption, the electrical conductivity, and the pH value, and it is better if they are optimized for the respective layers.

III. Non-Magnetic Layer

The magnetic recording medium of the present invention may have a non-magnetic layer comprising a binder and a non-magnetic powder between a non-magnetic support and the magnetic layer.

The non-magnetic powder that can be used in the non-magnetic layer may be an inorganic substance or an organic substance. It is also possible to use carbon black, etc. Examples of the inorganic substance include a metal, a metal oxide, a metal carbonate, a metal sulfate, a metal nitride, a metal carbide, and a metal sulfide. Specific examples thereof include a titanium oxide such as titanium dioxide, cerium oxide, tin oxide, tungsten oxide, ZnO, $ZrO_2$, $SiO_2$, $Cr_2O_3$, α-alumina having an α-component proportion of 90% to 100%, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide, and they can be used singly or in a combination of two or more types. α-iron oxide or a titanium oxide is preferable.

The form of the non-magnetic powder may be any one of acicular, spherical, polyhedral, and tabular. The crystallite size of the non-magnetic powder is preferably 0.004 to 1 μm, and more preferably 0.04 to 0.1 μm. It is preferable if it is in such a range, since good dispersibility and a smooth surface can be obtained.

The average particle size of these non-magnetic powders is preferably 0.005 to 2 μm, and more preferably 0.01 to 0.2 μm. It is also possible to combine non-magnetic powders having different average particle sizes as necessary, or widen the particle size distribution of a single non-magnetic powder, thus producing the same effect. It is preferable if it is in such a range, since good dispersibility and a smooth surface can be obtained.

The $S_{BET}$ of the non-magnetic powder is preferably 1 to 100 m$^2$/g, more preferably 5 to 70 m$^2$/g, and yet more preferably 10 to 65 m$^2$/g. When the specific surface area is in the above range, suitable surface roughness can be obtained, and dispersion can be carried out using a desired amount of binder.

The DBP oil absorption is preferably 5 to 100 mL/100 g, more preferably 10 to 80 mL/100 g, and yet more preferably 20 to 60 mL/100 g.

The specific gravity is preferably 1 to 12, and more preferably 3 to 6.

The tap density is 0.05 to 2 g/mL, and preferably 0.2 to 1.5 g/mL. It is preferable if the tap density is in the range of 0.05 to 2 g/mL, since there is little scattering of particles, the operation is easy, and it is possible to prevent the particles from sticking to equipment.

The pH of the non-magnetic powder is preferably 2 to 11, and particularly preferably 6 to 9. When the pH is less than 2, the coefficient of friction at high temperature and high humidity tends to increase. When the pH exceeds 11, the amount of free fatty acid decreases, and the coefficient of friction tends to increase.

The water content of the non-magnetic powder is preferably 0.1 to 5 wt %, more preferably 0.2 to 3 wt %, and yet more preferably 0.3 to 1.5 wt %. It is preferable if the water content is in the range of 0.1 to 5 wt %, since dispersion is good, and the viscosity of a dispersed coating solution becomes stable.

The ignition loss is preferably 20 wt % or less, and a small ignition loss is preferable.

When the non-magnetic powder is an inorganic powder, the Mohs hardness thereof is preferably in the range of 4 to 10. When the Mohs hardness is less than 4, it tends to be difficult to be able to guarantee durability.

The amount of stearic acid absorbed by the non-magnetic powder is preferably 1 to 20 $\mu mol/m^2$, and more preferably 2 to 15 $\mu mol/m^2$.

The heat of wetting of the non-magnetic powder in water at 25° C. is preferably in the range of 20 to 60 $\mu J/cm^2$ (200 to 600 $erg/cm^2$). It is possible to use a solvent that gives a heat of wetting in this range. The number of water molecules on the surface at 100° C. to 400° C. is suitably 1 to 10/100 Å. The pH at the isoelectric point in water is preferably between 3 and 9.

The surface of the non-magnetic powder is preferably subjected to a surface treatment with $Al_2O_3$, $SiO_2$, $TiO_2$, $ZrO_2$, $SnO_2$, $Sb_2O_3$, or ZnO. In terms of dispersibility in particular, $Al_2O_3$, $SiO_2$, $TiO_2$, and $ZrO_2$ are preferable, and $Al_2O_3$, $SiO_2$, and $ZrO_2$ are more preferable. They may be used in combination or singly. Depending on the intended purpose, a surface-treated layer may be obtained by co-precipitation, or a method can be employed in which the surface is firstly treated with alumina and the surface thereof is then treated with silica, or vice versa. The surface-treated layer may be formed as a porous layer depending on the intended purpose, but it is generally preferable for it to be uniform and dense.

Specific examples of the non-magnetic powder used in the non-magnetic layer of the present invention include Nanotite (manufactured by Showa Denko K.K.), HIT-100 and ZA-G1 (manufactured by Sumitomo Chemical Co., Ltd.), DPN-250, DPN-250BX, DPN-245, DPN-270BX, DPB-550BX, and DPN-550RX (manufactured by Toda Kogyo Corp.), titanium oxide TTO-51B, TTO-55A, TTO-55B, TTO-55C, TTO-55S, TTO-55D, SN-100, MJ-7, α-iron oxide E270, E271, and E300 (manufactured by Ishihara Sangyo Kaisha Ltd.), STT-4D, STT-30D, STT-30, and STT-65C (manufactured by Titan Kogyo Kabushiki Kaisha), MT-100S, MT-100T, MT-150W, MT-500B, MT-600B, MT-100F, and MT-500HD (manufactured by Tayca Corporation), FINEX-25, BF-1, BF-10, BF-20, and ST-M (manufactured by Sakai Chemical Industry Co., Ltd.), DEFIC-Y and DEFIC-R (manufactured by Dowa Mining Co., Ltd.), AS2BM and $TiO_2P25$ (manufactured by Nippon Aerosil Co., Ltd.), and 100A and 500A (manufactured by Ube Industries, Ltd.), Y-LOP (manufactured by Titan Kogyo Kabushiki Kaisha), and calcined products thereof. Particularly preferred non-magnetic powders are titanium dioxide and α-iron oxide.

By mixing carbon black with the non-magnetic powder, the surface electrical resistance (Rs) of the non-magnetic layer can be reduced, the light transmittance can be decreased, and a desired micro Vickers hardness can be obtained.

The micro Vickers hardness of the non-magnetic layer is usually 25 to 60 $kg/mm^2$, and is preferably 30 to 50 $kg/mm^2$ in order to adjust the head contact. The micro Vickers hardness can be measured using a thin film hardness meter (HMA-400 manufactured by NEC Corporation) with, as an indentor tip, a triangular pyramidal diamond needle having a tip angle of 80° and a tip radius of 0.1 μm.

The light transmittance is generally standardized such that the absorption of infrared rays having a wavelength of on the order of 900 nm is 3% or less and, in the case of, for example, VHS magnetic tapes, 0.8% or less. Because of this, furnace black for rubber, thermal black for rubber, carbon black for coloring, acetylene black, etc. can be used.

The specific surface area of the carbon black used in the non-magnetic layer of the present invention is preferably 100 to 500 $m^2/g$, and more preferably 150 to 400 $m^2/g$, and the DBP oil absorption thereof is preferably 20 to 400 mL/100 g, and more preferably 30 to 200 mL/100 g. The average particle size of the carbon black is preferably 5 to 80 nm, more preferably 10 to 50 nm, and yet more preferably 10 to 40 nm. The pH of the carbon black is preferably 2 to 10, the water content thereof is preferably 0.1% to 10%, and the tap density is preferably 0.1 to 1 g/mL.

Specific examples of the carbon black used in the present invention include BLACKPEARLS 2000, 1300, 1000, 900, 800, 880 and 700, and VULCAN XC-72 (manufactured by Cabot Corporation), #3050B, #3150B, #3250B, #3750B, #3950B, #950, #650B, #970B, #850B, and MA-600 (manufactured by Mitsubishi Chemical Corporation), CONDUCTEX SC, RAVEN 8800, 8000, 7000, 5750, 5250, 3500, 2100, 2000, 1800, 1500, 1255 and 1250 (manufactured by Columbian Carbon Co.), and Ketjen Black EC (manufactured by Akzo Nobel).

The carbon black may be surface treated using a dispersant or grafted with a resin, or part of the surface thereof may be converted into graphite. Prior to adding carbon black to a coating solution, the carbon black may be predispersed with a binder. The carbon black can be used in a range that does not exceed 50 wt % of the above-mentioned inorganic powder and in a range that does not exceed 40 wt % of the total weight of the non-magnetic layer. These types of carbon black may be used singly or in combination. The carbon black that can be used in the non-magnetic layer of the present invention can be selected by referring to, for example, the 'Kabon Burakku Binran' (Carbon Black Handbook) (edited by the Carbon Black Association of Japan).

It is also possible to add an organic powder to the non-magnetic layer, depending on the intended purpose. Examples thereof include an acrylic styrene resin powder, a benzoguanamine resin powder, a melamine resin powder, and a phthalocyanine pigment, but a polyolefin resin powder, a polyester resin powder, a polyamide resin powder, a polyimide resin powder, and a polyfluoroethylene resin can also be used.

IV. Other Additives

In the magnetic recording medium of the present invention, additives for imparting a dispersion effect, lubrication effect, antistatic effect, plasticizing effect, etc. may be included in the magnetic layer or the non-magnetic layer.

Examples of these additives are as follows.

Molybdenum disulfide, tungsten disulfide, graphite, boron nitride, graphite fluoride, a silicone oil, a polar group-containing silicone, a fatty acid-modified silicone, a fluorine-containing silicone, a fluorine-containing alcohol, a fluorine-containing ester, a polyolefin, a polyglycol, a polyphenyl ether; aromatic ring-containing organic phosphonic acids such as phenylphosphonic acid, benzylphosphonic acid, phenethylphosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, tolylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, and nonylphenylphosphonic acid, and alkali metal salts thereof; alkylphosphonic acids such as octylphosphonic acid, 2-ethylhexylphosphonic acid, isooctylphosphonic acid, (iso)nonylphosphonic acid, (iso)decylphosphonic acid, (iso)undecylphosphonic acid, (iso)dodecylphosphonic acid, (iso)hexadecylphosphonic acid, (iso)octadecylphosphonic acid, and (iso)eicosylphosphonic acid, and alkali metal salts thereof.

Aromatic phosphates such as phenyl phosphate, benzyl phosphate, phenethyl phosphate, α-methylbenzyl phosphate, 1-methyl-1-phenethyl phosphate, diphenylmethyl phosphate, biphenyl phosphate, benzylphenyl phosphate, α-cumyl phosphate, tolyl phosphate, xylyl phosphate, ethylphenyl phosphate, cumenyl phosphate, propylphenyl phosphate, butylphenyl phosphate, heptylphenyl phosphate, octylphenyl phosphate, and nonylphenyl phosphate, and alkali metal salts thereof; alkyl phosphates such as octyl phosphate, 2-ethylhexyl phosphate, isooctyl phosphate, (iso)nonyl phosphate, (iso)decyl phosphate, (iso)undecyl phosphate, (iso)dodecyl phosphate, (iso)hexadecyl phosphate, (iso)octadecyl phosphate, and (iso)eicosyl phosphate, and alkali metal salts thereof.

Alkyl sulfonates and alkali metal salts thereof; fluorine-containing alkyl sulfates and alkali metal salts thereof; monobasic fatty acids that have 10 to 24 carbons, may contain an unsaturated bond, and may be branched, such as lauric acid, myristic acid, palmitic acid, stearic acid, behenic acid, oleic acid, linoleic acid, linolenic acid, elaidic acid, and erucic acid, and metal salts thereof; mono-fatty acid esters, di-fatty acid esters, and poly-fatty acid esters such as butyl stearate, octyl stearate, amyl stearate, isooctyl stearate, octyl myristate, butyl laurate, butoxyethyl stearate, anhydrosorbitan monostearate, anhydrosorbitan distearate, and anhydrosorbitan tristearate that are formed from a monobasic fatty acid that has 10 to 24 carbons, may contain an unsaturated bond, and may be branched, and any one of a mono- to hexa-hydric alcohol that has 2 to 22 carbons, may contain an unsaturated bond, and may be branched, an alkoxy alcohol that has 12 to 22 carbons, may have an unsaturated bond, and may be branched, and a mono alkyl ether of an alkylene oxide polymer; fatty acid amides having 2 to 22 carbons; aliphatic amines having 8 to 22 carbons; etc. Other than the above-mentioned hydrocarbon groups, those having an alkyl, aryl, or aralkyl group that is substituted with a group other than a hydrocarbon group, such as a nitro group, F, Cl, Br, or a halogen-containing hydrocarbon such as $CF_3$, $CCl_3$, or $CBr_3$ can also be used.

Furthermore, there are a nonionic surfactant such as an alkylene oxide type, a glycerol type, a glycidol type, or an alkylphenol-ethylene oxide adduct; a cationic surfactant such as a cyclic amine, an ester amide, a quaternary ammonium salt, a hydantoin derivative, a heterocyclic compound, a phosphonium salt, or a sulfonium salt; an anionic surfactant containing an acidic group such as a carboxylic acid, a sulfonic acid or a sulfate ester group; and an amphoteric surfactant such as an amino acid, an aminosulfonic acid, a sulfate ester or a phosphate ester of an amino alcohol, or an alkylbetaine. Details of these surfactants are described in 'Kaimen-kasseizai Binran' (Surfactant Handbook) (published by Sangyo Tosho Publishing). These lubricants, antistatic agents, etc. need not always be pure and may contain, in addition to the main component, an impurity such as an isomer, an unreacted material, a by-product, a decomposition product, or an oxide. However, the impurity content is preferably 30 wt % or less, and more preferably 10 wt % or less.

Specific examples of these additives include NAA-102, hardened castor oil fatty acid, NAA42, Cation SA, Nymeen L-201, Nonion E-208, Anon BF, and Anon LG, (produced by Nippon Oil & Fats Co., Ltd.); FAL-205, and FAL-123 (produced by Takemoto Oil & Fat Co., Ltd), Enujelv OL (produced by New Japan Chemical Co., Ltd.), TA-3 (produced by Shin-Etsu Chemical Industry Co., Ltd.), Armide P (produced by Lion Armour), Duomin TDO (produced by Lion Corporation), BA-41G (produced by The Nisshin Oil Mills, Ltd.), Profan 2012E, Newpol PE 61, and Ionet MS400 (produced by Sanyo Chemical Industries, Ltd.).

The type and the amount of the dispersant, lubricant, and surfactant used in the present invention can be changed as necessary in the non-magnetic layer and the magnetic layer. For example, although not limited to only the examples illustrated here, the dispersant has the property of adsorbing or bonding via its polar group, and it is surmised that the dispersant adsorbs or bonds, via the polar group, to mainly the surface of the ferromagnetic powder in the magnetic layer and mainly the surface of the non-magnetic powder in the non-magnetic layer, and once adsorbed it is hard to desorb an organophosphorus compound from the surface of metal, a metal compound, etc. Therefore, since in the present invention the surface of the ferromagnetic powder or the surface of the non-magnetic powder are in a state in which they are covered with an alkyl group, an aromatic group, etc., the affinity of the ferromagnetic powder or the non-magnetic powder toward the binder resin component increases and, furthermore, the dispersion stability of the ferromagnetic powder or the non-magnetic powder is also improved. With regard to the lubricant, since it is present in a free state, its exudation to the surface is controlled by using fatty acids having different melting points for the non-magnetic layer and the magnetic layer or by using esters having different boiling points or polarity. The coating stability can be improved by regulating the amount of surfactant added, and the lubrication effect can be improved by increasing the amount of lubricant added to the non-magnetic layer.

All or a part of the additives used in the present invention may be added to a magnetic coating solution or a non-magnetic coating solution at any stage of its preparation. For example, the additives may be blended with a ferromagnetic powder prior to a kneading step, they may be added in a step of kneading a ferromagnetic powder, a binder, and a solvent, they may be added in a dispersing step, they may be added after dispersion, or they may be added immediately prior to coating.

An organic solvent used for the magnetic layer or the non-magnetic layer of the present invention can be a known organic solvent. As the organic solvent, a ketone such as acetone, methyl ethyl ketone, methyl isobutyl ketone, diisobutyl ketone, cyclohexanone, or isophorone, an alcohol such as methanol, ethanol, propanol, butanol, isobutyl alcohol, isopropyl alcohol, or methylcyclohexanol, an ester such as methyl acetate, butyl acetate, isobutyl acetate, isopropyl acetate, ethyl lactate, or glycol acetate, a glycol ether such as glycol dimethyl ether, glycol monoethyl ether, or dioxane, an aromatic hydrocarbon such as benzene, toluene, xylene, cresol, or chlorobenzene, a chlorohydrocarbon such as methylene chloride, ethylene chloride, carbon tetrachloride, chloroform, ethylene chlorohydrin, or dichlorobenzene, N,N-dimethylformamide, hexane, tetrahydrofuran, etc. can be used at any ratio.

These organic solvents do not always need to be 100% pure, and may contain an impurity such as an isomer, an unreacted compound, a by-product, a decomposition product, an oxide, or moisture in addition to the main component. The content of these impurities is preferably 30% or less, and more preferably 10% or less. The organic solvent used in the present invention is preferably the same type for both the magnetic layer and the non-magnetic layer. However, the amount added may be varied. The coating stability is improved by using a high surface tension solvent (cyclohexanone, dioxane, etc.) for the non-magnetic layer; more specifically, it is important that the arithmetic mean value of the surface tension of the magnetic layer solvent composition is not less than that for the surface tension of the non-magnetic layer solvent composition. In order to improve the dispersibility, it is preferable for the polarity to be somewhat strong, and the solvent composition preferably contains 50% or more of a solvent having a permittivity of 15 or higher. The solubility parameter is preferably 8 to 11.

V. Non-Magnetic Support

In the magnetic recording medium of the present invention, the non-magnetic layer or the magnetic layer is formed by coating a non-magnetic support with a coating solution prepared using the above-mentioned materials.

With regard to the non-magnetic support that can be used in the present invention, known biaxially stretched films such as polyethylene naphthalate, polyethylene terephthalate, polyamide, polyimide, polyamideimide, aromatic polyamide, and polybenzoxazole can be used. Polyethylene naphthalate and aromatic polyamide are preferred. These non-magnetic supports can be subjected in advance to a corona discharge treatment, a plasma treatment, a treatment for enhancing adhesion, a thermal treatment, etc.

The non-magnetic support that can be used in the present invention preferably has a surface having excellent smoothness such that its center line average surface roughness is in the range of 0.1 to 20 nm, and preferably 1 to 10 nm, for a cutoff value of 0.25 mm. Furthermore, these non-magnetic supports preferably have not only a small center line average surface roughness but also no coarse projections with a height of 1 µm or greater.

The arithmetic average roughness (Ra) of the treated non-magnetic support is preferably 0.1 µm or less [JIS B0660-1998, ISO 4287-1997] since a magnetic recording medium obtained therefrom has a low level of noise.

A preferred thickness of the non-magnetic support of the magnetic recording medium of the present invention is 3 to 80 µm.

VI. Backcoat Layer

A backcoat layer (backing layer) may be provided on the side of the non-magnetic support used in the present invention that is not coated with a magnetic coating solution. The backcoat layer is a layer provided by applying, on the side of the non-magnetic support that is not coated with the magnetic coating solution, a backcoat layer-forming coating solution in which particulate components such as an abrasive or an antistatic agent and a binder are dispersed in an organic solvent. As the particulate components, various inorganic pigments or carbon black can be used, and as the binder, resins such as nitrocellulose, a phenoxy resin, or polyurethane can be used singly or as a mixture thereof. An adhesive layer may be provided on the side of the non-magnetic support of the present invention that is coated with the magnetic coating solution or the backcoat layer-forming coating solution.

VII. Undercoat Layer

In the magnetic recording medium of the present invention, an undercoat layer can be provided. Providing the undercoat layer enables the adhesion between the support and the magnetic layer or the non-magnetic layer to be improved. A solvent-soluble polyester resin can be used in the undercoat layer. The thickness of the undercoat layer is 0.5 µm or less.

VIII. Smoothing Layer

The magnetic recording medium of the present invention may be provided with a smoothing layer. The smoothing layer referred to here is a layer for burying projections on the surface of the non-magnetic support; it is provided between the non-magnetic support and the magnetic layer when the magnetic recording medium is provided with the magnetic layer on the non-magnetic support, and it is provided between the non-magnetic support and the non-magnetic layer when the magnetic recording medium is provided with the non-magnetic layer and the magnetic layer in that order on the non-magnetic support.

The smoothing layer can be formed by curing a radiation curable compound by exposure to radiation. The radiation curable compound referred to here is a compound having the property of polymerizing or crosslinking when irradiated with radiation such as ultraviolet rays or an electron beam, thus increasing the molecular weight and carrying out curing.

IX. Production Method

A process for producing a magnetic layer coating solution for the magnetic recording medium used in the present invention comprises at least a kneading step, a dispersing step and, optionally, a blending step that is carried out prior to and/or subsequent to the above-mentioned steps. Each of these steps may be composed of two or more separate stages. All materials, including the magnetic powder (the ferromagnetic hexagonal ferrite powder, the ferromagnetic metal powder), the non-magnetic powder, the binder, the carbon black, the abrasive, the antistatic agent, the lubricant, and the solvent used in the present invention may be added in any step from the beginning or during the course of the step. The addition of each material may be divided across two or more steps.

In the process for producing the magnetic recording medium of the present invention, when preparing the magnetic coating solution, which is a coating solution for the magnetic layer, at least one magnetic coating solution is prepared in which a ferromagnetic powder is dispersed in a binder solution containing the polyurethane resin (A). When preparing this magnetic coating solution, a kneading step is employed in which the ferromagnetic powder and the polyurethane resin (A), as all or part of the binder for the magnetic layer, are kneaded. In the kneading step, it is preferable to use a conventionally known powerful kneading machine such as an open kneader, a continuous kneader, a pressure kneader, or an extruder. When such a kneader is used, all or part of the binder (preferably 30 wt % or more of the entire binder) is preferably kneaded with the magnetic powder. The proportion of the binder added is preferably 10 to 500 parts by weight relative to 100 parts by weight of the ferromagnetic powder. Details of these kneading treatments are described in JP-A-1-106338 and JP-A-1-79274.

A dispersing step is carried out subsequent to the kneading step. A coating solvent is added to the mixture of the ferromagnetic powder and the binder obtained in the kneading step, and the ferromagnetic powder is completely dispersed in the binder solution using a sand mill, etc. In order to disperse the magnetic layer coating solution or a non-magnetic layer coating solution, glass beads can be used. As such glass beads, a dispersing medium having a high specific gravity such as zirconia beads, titania beads, or steel beads is suitably used. An optimal particle size and packing ratio of these dispersing media is used. A known disperser such as a sand mill can be used.

With regard to a method for coating the non-magnetic support with the magnetic coating solution, for example, the surface of a moving non-magnetic support is coated with a magnetic layer coating solution so as to give a predetermined coating thickness. A plurality of magnetic layer coating solutions can be applied successively or simultaneously in multilayer coating, and a non-magnetic layer coating solution and a magnetic layer coating solution can also be applied successively or simultaneously in multilayer coating. As coating equipment for applying the above-mentioned magnetic coating solution or the lower layer coating solution, an air doctor coater, a blade coater, a rod coater, an extrusion coater, an air knife coater, a squeegee coater, a dip coater, a reverse roll coater, a transfer roll coater, a gravure coater, a kiss coater, a cast coater, a spray coater, a spin coater, etc. can be used.

With regard to these, for example, 'Saishin Kotingu Gijutsu' (Latest Coating Technology) (May 31, 1983) published by Sogo Gijutsu Center can be referred to. As examples of the coating equipment and the coating method for the magnetic recording medium of the present invention, the following can be proposed.

(1) A lower layer is firstly applied by coating equipment such as gravure, roll, blade, or extrusion coating equipment, which is generally used for coating with a magnetic coating solution, and before the lower layer has dried an upper layer is applied by a pressurized support type extrusion coating device such as one disclosed in JP-B-146186, JP-A-60-238179, or JP-A-2-265672 (JP-B denotes a Japanese examined patent application publication).

(2) Upper and lower layers are substantially simultaneously applied by means of one coating head having two slits for a coating solution to pass through, such as one disclosed in JP-A-63-88080, JP-A-2-17971, or JP-A-2-265672.

(3) Upper and lower layers are substantially simultaneously applied by means of an extrusion coating device with a backup roll, such as one disclosed in JP-A-2-174965.

The thickness of the magnetic layer of the magnetic recording medium of the present invention is optimized according to the head saturation magnetization, the head gap, and the bandwidth of the recording signal, and is generally 0.01 to 0.10 μm, preferably 0.02 to 0.08 μm, and more preferably 0.03 to 0.08 μm. The magnetic layer can be divided into two or more layers having different magnetic properties, and the configuration of a known multilayer magnetic layer can be employed.

When a non-magnetic layer is provided in the present invention, the thickness thereof is preferably 0.2 to 3.0 μm, more preferably 0.3 to 2.5 μm, and yet more preferably 0.4 to 2.0 μm. The non-magnetic layer of the magnetic recording medium of the present invention exhibits its effect as long as it is substantially non-magnetic, but even if it contains a small amount of a magnetic substance as an impurity or intentionally, if the effects of the present invention are exhibited, the constitution can be considered to be substantially the same as that of the magnetic recording medium of the present invention. 'Substantially the same' referred to here means that the non-magnetic layer has a residual magnetic flux density of 10 mT (100 G) or less or a coercive force of 7.96 kA/m (100 Oe) or less, and preferably has no residual magnetic flux density and no coercive force.

The polyurethane resin (A) may be used as all or part of the binder of the non-magnetic layer. It is preferable to use it as all of the binder of the non-magnetic layer.

In the present invention, it is preferable to provide the lower layer containing the inorganic powder on the support in order to apply the magnetic layer stably, and to apply the magnetic layer by a wet-on-wet method.

In the case of a magnetic tape, the coated layer of the magnetic layer coating solution is subjected to a magnetic field alignment treatment in which the ferromagnetic powder contained in the coated layer of the magnetic layer coating solution is aligned in the longitudinal direction using a cobalt magnet or a solenoid. In the case of a disk, although sufficient isotropic alignment can sometimes be obtained without using an alignment device, it is preferable to employ a known random alignment device such as, for example, arranging obliquely alternating cobalt magnets or applying an alternating magnetic field with a solenoid. The isotropic alignment referred to here means that, in the case of a ferromagnetic metal powder, in general, in-plane two-dimensional random is preferable, but it can be three-dimensional random by introducing a vertical component. In the case of a ferromagnetic hexagonal ferrite powder, in general, it tends to be in-plane and vertical three-dimensional random, but in-plane two-dimensional random is also possible. By using a known method such as magnets having different poles facing each other so as to make vertical alignment, circumferentially isotropic magnetic properties can be introduced. In particular, when carrying out high density recording, vertical alignment is preferable. Furthermore, circumferential alignment may be employed using spin coating.

It is preferable for the drying position for the coating to be controlled by controlling the drying temperature and blowing rate and the coating speed; it is preferable for the coating speed to be 20 to 1,000 m/min and the temperature of drying air to be 60° C. or higher, and an appropriate level of pre-drying may be carried out prior to entering a magnet zone.

After drying is carried out, the coated layer is subjected to a surface smoothing treatment. The surface smoothing treatment employs, for example, super calender rolls, etc. By carrying out the surface smoothing treatment, cavities formed by removal of the solvent during drying are eliminated, thereby increasing the packing ratio of the ferromagnetic powder in the magnetic layer, and a magnetic recording medium having high electromagnetic conversion characteristics can thus be obtained.

With regard to calendering rolls, rolls of a heat-resistant plastic such as epoxy, polyimide, polyamide, or polyamide-imide are used. It is also possible to treat with metal rolls.

The magnetic recording medium of the present invention preferably has a center line average surface roughness in the range of 0.1 to 4 nm for a cutoff value of 0.25 mm, and more preferably 1 to 3 nm, which is extremely smooth. As a method therefor, a magnetic layer formed by selecting a specific ferromagnetic powder and binder as described above is subjected to the above-mentioned calendering treatment.

The calender roll temperature is preferably in the range of 60° C. to 100° C., more preferably in the range of 70° C. to 100° C., and yet more preferably in the range of 80° C. to 100° C. The calender roll pressure is preferably in the range of 100 to 500 kg/cm, more preferably in the range of 200 to 450 kg/cm, and yet more preferably in the range of 300 to 400 kg/cm. The magnetic recording medium thus obtained can be cut to a desired size using a cutter, etc. before use.

In the present invention, a thermal curing treatment may be carried out subsequent to the above-mentioned step. The thermal curing treatment is preferably carried out at 40° C. to 100° C. for 6 to 2,400 hours, and more preferably at 50° C. to 90° C. for 12 to 1,200 hours.

The polyurethane resin (A) of the present invention has overcome the degradation of durability due to a decrease in the crosslinking properties by introducing an epoxy group into the main chain of the polyurethane while maintaining the glass transition temperature (Tg) at the 70° C. or higher of the conventionally employed vinyl chloride resin. Some of the epoxy groups contained in the polyurethane resin (A) of the present invention react with the surface of the magnetic substance due to the shear energy involved in kneading the polyurethane and the magnetic substance in the organic solvent, and are thus ring-opened. The hydroxyl group thus formed can make a crosslinking structure with the polyisocyanate curing agent.

Although there is a patent application in the art relating to a polyurethane resin into which an epoxy group is introduced, since the epoxy group is introduced at the terminus of the urethane chain, sufficient strength can not be obtained from a crosslinked product of a polyisocyanate curing agent and a hydroxyl group formed by ring opening of the epoxy group.

In the present invention, by introducing the epoxy-modified diol into the polyurethane main chain, an epoxy group can be introduced at a middle position of the polyurethane main chain, thus enabling a crosslinked structure to be formed and the durability to be improved outstandingly.

Furthermore, since this epoxy group reacts with the surface of the magnetic substance, adsorption of the binder onto the non-magnetic support increases, thus improving the dispersibility of the fine magnetic substance, and a low molecular weight component in the binder, which influences the strength of the surface portion of the magnetic layer, is anchored to the surface of the magnetic substance, thereby giving a magnetic recording medium in which the surface of the magnetic layer is tough and resistant to being scraped off.

By ensuring that the polyurethane resin employed as the binder in the present invention has a Tg of 70° C. to 200° C., it is possible to guarantee the strength of the entire coating, and by carrying out a ring-opening reaction of the epoxy group introduced into the polyurethane chain and carrying out a curing reaction, the strength in the vicinity of the surface of the coating is outstandingly improved; as a result, not only can the durability and the long-term storage stability of the magnetic recording medium be improved, but also the electromagnetic conversion characteristics can be improved.

EXAMPLES

Synthetic examples of the polyurethane resin (A) used as the binder, specific examples of use of the polyurethane resin (A), and comparative examples are explained below, but the present invention is not limited to these examples. 'Parts' in the examples means 'parts by weight' unless otherwise specified.

Synthesis of Epoxy-Modified Diol (A)

An epoxy-modified diol (A), which is an epoxy-modified polyhydric alcohol, was synthesized by the following method.

A reactor equipped with a thermometer and a stirrer was charged with glycerol (92 g) and epichlorohydrin (184 g), a 5% boron trifluoride diethyl ether solution (5 g) was added thereto while stirring, and a reaction was carried out at a reaction temperature of 50° C. to 75° C. for 5 hours while cooling with iced water. The product obtained in the above reaction was dissolved in dioxane (900 g), sodium aluminate (300 g) was added to the solution thus obtained, and a reaction was carried out at 100° C. for 10 hours. After the reaction was completed, the reaction mixture was cooled to room temperature, insoluble material was removed by filtration, and finally low boiling point compounds were removed by distillation at 205° C. and 20 mmHg to give the epoxy-modified diol (A) as the reaction product.

Synthesis of Epoxy-Modified Diols (B) to (H)

Epoxy-modified diols (B) to (H), which are epoxy-modified polyhydric alcohols, were synthesized by the following method.

Epoxy-modified diols (B) to (H) were obtained in the same manner as in the synthesis of the epoxy-modified diol (A) except that instead of glycerol (92 g) the compounds below were used at the weights indicated.

| Epoxy-modified diol (B) | trimethylolpropane | 134 g |
| Epoxy-modified diol (C) | trimethylolethane | 120 g |
| Epoxy-modified diol (D) | diglycerol | 83 g |
| Epoxy-modified diol (E) | ditrimethylolpropane | 125 g |
| Epoxy-modified diol (F) | pentaerythritol | 68 g |
| Epoxy-modified diol (G) | sorbitol | 46 g |
| Epoxy-modified diol (H) | dipentaerythritol | 64 g |

Synthesis of Polyurethane Resin 1 (PU1)

A reactor equipped with a reflux condenser and a stirrer was flushed with nitrogen, and a polyol having the composition shown in Table 1 and the epoxy-modified compound (A) were dissolved in cyclohexanone under a flow of nitrogen at 60° C. to give a 30% solution. Dibutyltin dilaurate (60 ppm) was added thereto as a catalyst and the mixture was stirred for 15 minutes. The diisocyanate shown in Table 1 was added thereto at 0.99 times the total number of moles of the polyol and the epoxy-modified diol, and the mixture was reacted at 90° C. for 6 hours while heating to give polyurethane resin 1 (PU1).

Synthesis of Polyurethane Resins 2 to 12 (PU2 to 12)

Polyurethane resins 2 to 8, 10, and 11 were obtained in the same manner as for the polyurethane resin 1 (PU1) using the starting materials and composition ratios shown in Table 1.

Polyurethane resin 12 (PU12) was synthesized by adding the diisocyanate to the polyol at 1.01 times the number of moles of the polyol without using an epoxy-modified diol so as to carry out a polymerization to form a polyurethane having isocyanate termini, and then adding an equivalent of glycidol relative to the isocyanate groups of the polyurethane. Polyurethane resin 12 was a polyurethane resin having epoxy groups introduced only at the polyurethane chain termini.

Polyurethane 9 (PU9) was synthesized by adding the diisocyanate to the polyol at 0.99 times the number of moles of the polyol without using an epoxy-modified diol. Polyurethane resin 9 was a polyurethane resin having no epoxy group introduced therein.

The polyols, isocyanate compounds, and epoxy-modified diols used in the Synthesis of PU1 to PU12 are shown in Table 1.

The epoxy group content of the polyurethane resins and the weight-average molecular weight and the glass transition temperature of the polyurethane resins PU1 to PU12 thus obtained are shown in Table 1.

(TABLE 1)

| No. | Polyol constitution | Polyol Molar ratio | Diisocyanate compound | Epoxy-modified diol | Epoxy group content ×10⁻⁵ eq/g | Epoxy group content groups/molecule | Weight-average molecular weight | Tg (° C.) |
|---|---|---|---|---|---|---|---|---|
| PU1 | Polyester polyol a/DEIS | 100/2 | MDI | A | 4.8 | 2 | 42000 | 80 |
| PU2 | DD/HBpA/DEIS | 40/60/2 | MDI | A | 4.2 | 2 | 48000 | 100 |
| PU3 | DD/HBpA/DEIS | 15/85/2 | MDI | A | 4.2 | 2 | 47500 | 160 |
| PU4 | DD/HBpA/DEIS | 5/95/2 | MDI | A | 4.3 | 2 | 46000 | 200 |
| PU5 | DD/HBpA/DEIS | 40/60/2 | MDI | D | 17.4 | 8 | 46000 | 98 |
| PU6 | DD/HBpA/DEIS | 40/60/2 | MDI | G | 42.6 | 20 | 47000 | 97 |
| PU7 | DD/HBpA/DEIS | 40/60/2 | MDI | G | 80.0 | 36 | 45000 | 93 |
| PU8 | DD/HBpA/DEIS | 40/60/2 | MDI | A | 2.0 | 1 | 49000 | 102 |
| PU9 | DD/HBpA/DEIS | 40/60/2 | MDI | — | 0.0 | 0 | 42000 | 100 |
| PU10 | DD/HBpA/DEIS | 0/100/2 | MDI | A | 4.1 | 2 | 49000 | 220 |
| PU11 | Polyester polyol b/DEIS | 100/2 | MDI | A | 4.3 | 2 | 47000 | 60 |
| PU12 | DD/HBpA/DEIS | 40/60/2 | MDI | — | 4.3 | 2 | 46000 | 100 |

DD: Dimer diol
HBpA: Hydrogenated bisphenol A
DEIS: Ethylene oxide (2 moles) adduct of Na sulfoisophthalate
MDI: Diphenylmethane diisocyanate
Polyester polyol a: Isophthalic acid/adipic acid/neopentyl glycol = 0.8/0.7/1 molar ratio
Polyester polyol b: Adipic acid/neopentyl glycol = 1.5/1 molar ratio Epoxy-modified diol (A)

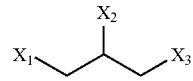

$X_1$ to $X_3$: one glycidyl ether group and two hydroxyl groups

Epoxy-modified diol (D)

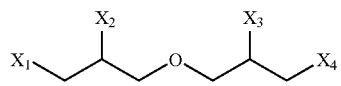

$X_1$ to $X_4$: two glycidyl ether groups and two hydroxyl groups

Epoxy-modified diol (G)

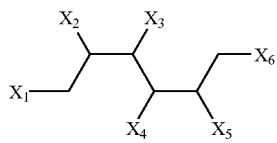

$X_1$ to $X_6$: four glycidyl ether groups and two hydroxyl groups

Example 1-1

Preparation of magnetic coating solution

| | |
|---|---|
| Ferromagnetic acicular metal powder (MP1) | 100 parts |
| (composition: Fe/Co/Al/Y = 62/25/5/8; surface treatment agent: Al₂O₃, Y₂O₃; Hc 167 kA/m (2,100 Oe); crystallite size 11 nm; major axis length 60 nm; acicular ratio 6; $S_{BET}$ 70 m²/g; σs 110 A·m²/kg (emu/g)) | |
| PU1 (shown in Table 1) | 50 parts |
| phenyl phosphate | 3 parts |
| α-Al₂O₃ (particle size 0.15 μm) | 2 parts, and |
| carbon black (particle size 20 nm) | 2 parts |
| were kneaded in an open kneader for 60 minutes, then | |
| cyclohexanone | 110 parts |
| methyl ethyl ketone | 100 parts |
| toluene | 100 parts |
| butyl stearate | 2 parts, and |
| stearic acid | 1 part |
| were added thereto and dispersed in a sand mill for 120 minutes. To the dispersion thus obtained was added | |

-continued

Preparation of magnetic coating solution

| | |
|---|---|
| trifunctional low molecular weight polyisocyanate compound | 6 parts |
| (Coronate 3041, manufactured by Nippon Polyurethane Industry Co., Ltd.), | |
| the mixture was stirred for a further 20 minutes, and filtered using a filter having an average pore size of 1 μm to give a magnetic coating solution. | |

Preparation of non-magnetic coating solution

| | |
|---|---|
| Non-magnetic inorganic powder | 85 parts |
| (α-iron oxide: surface treatment agent: Al₂O₃, SiO₂; major axis length 0.15 μm; tap density 0.8 g/mL; acicular ratio 7; $S_{BET}$ 52 m²/g; pH 8; DBP oil absorption 33 mL/100 g) | |
| carbon black | 20 parts |

-continued

| Preparation of non-magnetic coating solution | |
|---|---|
| (DBP oil absorption 120 mL/100 g, pH 8, specific surface area 250 m²/g, volatile content 1.5%) | |
| PU1 (shown in Table 1) | 15 parts |
| phenyl phosphate | 3 parts, and |
| α-Al₂O₃ (average particle size 0.2 μm) | 1 part |
| were kneaded in an open kneader for 60 minutes, then | |
| cyclohexanone | 140 parts |
| methyl ethyl ketone | 170 parts |
| butyl stearate | 2 parts, and |
| stearic acid | 1 part |
| were added thereto and dispersed in a sand mill for 120 minutes. To the dispersion thus obtained was added | |
| trifunctional low molecular weight polyisocyanate compound | 6 parts |

(Coronate 3041, manufactured by Nippon Polyurethane Industry Co., Ltd.), the mixture was stirred for a further 20 minutes, and filtered using a filter having an average pore size of 1 μm to give a non-magnetic coating solution.

A 6 μm thick polyethylene naphthalate (PEN) base was subjected to simultaneous multilayer coating with the non-magnetic coating solution, which was applied so that the dry thickness would be 1.8 μm, followed immediately by the magnetic coating solution, which was applied so that the dry thickness would be 0.08 μm. Before the two layers had dried, magnetic field alignment was carried out using a 3,000 gauss magnet; after drying, a surface smoothing treatment employing a 7 stage calender consisting of metal rolls alone at a speed of 100 m/min, a line pressure of 300 kg/cm and a temperature of 90° C., and a thermal curing treatment at 70° C. for 24 hours were carried out, followed by slitting to a width of 6.35 mm to give a magnetic tape.

Examples 1-2 to 1-8 and Comparative Examples 1-1 to 1-4

Magnetic tapes of Examples 1-2 to 1-8 and Comparative Examples 1-1 to 1-4 were prepared in the same manner as in Example 1-1 except that the polyurethane resin was changed to the polyurethane resins (PU2 to PU12) shown in Table 2.

Examples 2-1 to 2-8, Comparative Examples 2-1 to 2-4

| | |
|---|---|
| The magnetic substance of Example 1-1 was changed to ferromagnetic plate-shaped hexagonal ferrite powder (BF1) | 100 parts |

(composition (molar ratio) Ba/Fe/Co/Zn=1/9/0.2/1, Hc 159 kA/m (2,000 Oe), plate size 25 nm, plate ratio 3, $S_{BET}$ 80 m²/g, as 50 A·m²/kg (emu/g)), and magnetic tapes of Examples 2-1 to 2-8 and Comparative Examples 2-1 to 2-4 were prepared using the polyurethane resins 1 to 12 shown in Table 3.

Measurement Methods

1. Binder Adsorption

A magnetic coating solution was centrifuged, the solids content of the supernatant was measured, and the proportion of adsorbed components was determined.

2. Coating Smoothness

The center line average surface roughness Ra for a cutoff value of 0.25 mm was obtained by an optical interference method using a digital optical profiler (manufactured by WYKO). The coating smoothness of examples employing a ferromagnetic acicular metal powder in the magnetic layer was expressed as a value relative to 10.0 for the value of Comparative Example 1-1, and the coating smoothness of examples employing a ferromagnetic plate-shaped hexagonal ferrite powder was expressed as a value relative to 10.0 for the value of Comparative Example 2-1.

3. Electromagnetic Conversion Characteristics

A single frequency signal at 4.7 MHz was recorded using a DDS3 drive at an optimum recording current, and the playback output was measured. The playback output of examples employing a ferromagnetic acicular metal powder in the magnetic layer was expressed as a value relative to 0.0 dB for the playback output of Comparative Example 1-1, and the playback output of examples employing a ferromagnetic plate-shaped hexagonal ferrite powder was expressed as a value relative to 0.0 dB for the playback output of Comparative Example 2-1

4. Head Contamination After Transport

The head contamination was inspected after repeating 100 passes of 60 minutes length in the above drive at 23° C. and 10% RH; when there was contamination, the result was evaluated as B, and when there was no contamination the result was evaluated as A.

5. Head Contamination After Transport of Tape Stored at 60° C. and 90% RH

A tape stored in the above-mentioned environment for 1 week was subjected to repetitive transport under the same conditions as above, and the head was inspected for contamination.

6. Glass Transition Temperature (Tg)

A 20 μm thick film of a binder resin alone was formed, and the E" peak temperature was measured using a Vibron (manufactured by Orientech).

The measurement results are shown in Table 2 and Table 3.

TABLE 2

| | Magnetic substance | Binder | Binder adsorption (mg/g of magnetic substance) | Magnetic layer smoothness | Electromagnetic conversion characteristics C/N (dB) | Head contamination after transport | Head contamination after storage at 60° C. 90% RH |
|---|---|---|---|---|---|---|---|
| Example 1-1 | MP1 | PU1 | 98 | 6.8 | 2.1 | A | A |
| Example 1-2 | MP1 | PU2 | 96 | 7.2 | 2.0 | A | A |
| Example 1-3 | MP1 | PU3 | 92 | 7.6 | 1.8 | A | A |
| Example 1-4 | MP1 | PU4 | 90 | 8.0 | 1.2 | A | A |
| Example 1-5 | MP1 | PU5 | 103 | 7.0 | 2.2 | A | A |

TABLE 2-continued

| | Magnetic substance | Binder | Binder adsorption (mg/g of magnetic substance) | Magnetic layer smoothness | Electromagnetic conversion characteristics C/N (dB) | Head contamination after transport | Head contamination after storage at 60° C. 90% RH |
|---|---|---|---|---|---|---|---|
| Example 1-6 | MP1 | PU6 | 110 | 6.6 | 2.4 | A | A |
| Example 1-7 | MP1 | PU7 | 120 | 6.0 | 2.6 | A | A |
| Example 1-8 | MP1 | PU8 | 80 | 8.0 | 1.0 | A | A |
| Comparative Example 1-1 | MP1 | PU9 | 60 | 10.0 | 0.0 | B | B |
| Comparative Example 1-2 | MP1 | PU10 | 55 | 12.0 | −1.5 | A | B |
| Comparative Example 1-3 | MP1 | PU11 | 62 | 9.7 | 0.2 | B | B |
| Comparative Example 1-4 | MP1 | PU12 | 80 | 8.0 | 1.0 | A | B |

TABLE 3

| | Magnetic substance | Binder | Binder adsorption (mg/g of magnetic substance) | Magnetic layer smoothness | Electromagnetic conversion characteristics C/N (dB) | Head contamination after transport | Head contamination after storage at 60° C. 90% RH |
|---|---|---|---|---|---|---|---|
| Example 2-1 | BF1 | PU1 | 100 | 7.0 | 2.2 | A | A |
| Example 2-2 | BF1 | PU2 | 94 | 7.3 | 2.0 | A | A |
| Example 2-3 | BF1 | PU3 | 91 | 7.8 | 1.9 | A | A |
| Example 2-4 | BF1 | PU4 | 90 | 8.0 | 1.2 | A | A |
| Example 2-5 | BF1 | PU5 | 105 | 7.0 | 2.2 | A | A |
| Example 2-6 | BF1 | PU6 | 113 | 6.2 | 2.4 | A | A |
| Example 2-7 | BF1 | PU7 | 116 | 6.0 | 2.5 | A | A |
| Example 2-8 | BF1 | PU8 | 80 | 8.0 | 1.2 | A | A |
| Comparative Example 2-1 | BF1 | PU9 | 58 | 10.0 | 0.0 | B | B |
| Comparative Example 2-2 | BF1 | PU10 | 50 | 14.0 | −1.8 | A | B |
| Comparative Example 2-3 | BF1 | PU11 | 60 | 9.7 | 0.5 | B | B |
| Comparative Example 2-4 | BF1 | PU12 | 78 | 8.2 | 0.8 | B | B |

Polyurethane resins 21 to 25 (PU21 to 25) were synthesized in the same manner as for the synthesis of the polyurethane resin 1 (PU1) except that the epoxy-modified diols (B), (C), (E), (F), and (H) were used instead of the epoxy-modified diol (A). Magnetic recording media were prepared in the same manner as in Example 1-1 except that the polyurethane resins (PU21 to 25) were used instead of the polyurethane resin 1 (PU1). Evaluation was carried out using the same methods as in Example 1-1, and the same results as in Example 1-1 were obtained.

What is claimed is:

1. A magnetic recording medium comprising:
   a non-magnetic support;
   at least one magnetic layer provided above the non-magnetic support, the magnetic layer comprising a ferromagnetic powder dispersed in a binder;
   all or part of the binder being a polyurethane resin obtained by a reaction of a polyol and a polyisocyanate;
   the polyurethane resin having a glass transition temperature (Tg) of 70° C. to 200° C.; and
   part of the polyol being a diol having at least one epoxy group and two hydroxyl groups per molecule.

2. The magnetic recording medium according to claim 1, wherein the diol is an epoxy-modified tri- or higher-hydric alcohol.

3. The magnetic recording medium according to claim 1, wherein the diol is selected from the group consisting of compounds (I) to (VIII) below:

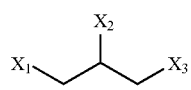
(I)

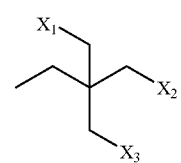
(II)

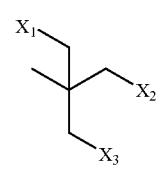
(III)

wherein, among $X_1$, $X_2$, and $X_3$, one thereof is a glycidyl ether group and two thereof are hydroxyl groups,

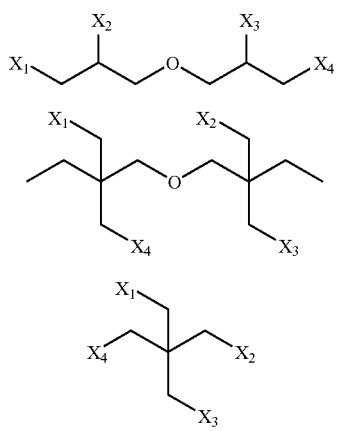

wherein, among $X_1$ to $X_4$, two thereof are glycidyl ether groups and two thereof are hydroxyl groups, and

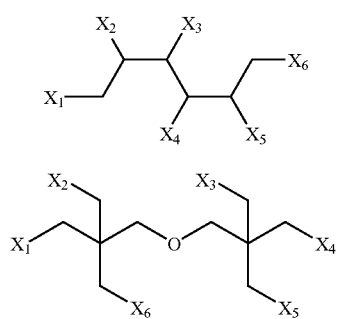

wherein, among $X_1$ to $X_6$, four thereof are glycidyl ether groups and two thereof are hydroxyl groups.

4. The magnetic recording medium according to claim 1, wherein the diol is selected from the group consisting of the above compounds (I), (IV), and (VII).

5. The magnetic recording medium according to claim 1, wherein the medium comprises at least one non-magnetic layer provided between the non-magnetic support and the magnetic layer, the non-magnetic layer comprising a non-magnetic powder dispersed in a binder, all or part of the binder being a polyurethane resin obtained by a reaction of a polyol and a polyisocyanate, the polyurethane resin having a glass transition temperature (Tg) of 70° C. to 200° C., and part of the polyol being a diol having at least one epoxy group and two hydroxyl groups per molecule.

6. The magnetic recording medium according to claim 1, wherein the polyurethane resin has an epoxy group content of $2 \times 10^{-5}$ to $8 \times 10^{-4}$ eq/g.

7. The magnetic recording medium according to claim 1, wherein the polyol comprises a long chain diol and, as a chain extending agent, a short chain diol.

8. The magnetic recording medium according to claim 1, wherein the polyisocyanate is a diisocyanate compound.

9. The magnetic recording medium according to claim 1, wherein the polyurethane resin contains a polar group selected from the group consisting of —$SO_3M$, —$SO_4M$, —$PO(OM)_2$, —$OPO(OM)_2$, —COOM, >$NSO_3M$, —$NR^1SO_3M$, —$NR^1R^2$, and —$N^+R^1R^2R^3X^-$ (M denotes a hydrogen atom, an alkali metal, or an ammonium, $R^1$, $R^2$, and $R^3$ independently denote a hydrogen atom or an alkyl group, and X denotes a monovalent halide ion).

10. The magnetic recording medium according to claim 1, wherein the ferromagnetic powder is a ferromagnetic metal powder.

11. The magnetic recording medium according to claim 1, wherein the ferromagnetic powder is a ferromagnetic hexagonal ferrite powder.

12. The magnetic recording medium according to claim 10, wherein the ferromagnetic metal powder has a major axis length of 35 to 70 nm.

13. The magnetic recording medium according to claim 11, wherein the ferromagnetic hexagonal ferrite powder has a plate size of 5 to 40 nm.

14. The magnetic recording medium according to claim 1, wherein the non-magnetic support is selected from the group consisting of polyethylene naphthalate, polyethylene terephthalate, polyamide, polyimide, polyamideimide, aromatic polyamide, and polybenzoxazole.

15. The magnetic recording medium according to claim 1, wherein the non-magnetic support has a center line average surface roughness of 0.1 to 20 nm for a cutoff value of 0.25 mm.

16. The magnetic recording medium according to claim 1, wherein the magnetic layer has a thickness of 0.01 to 0.10 μm.

17. The magnetic recording medium according to claim 1, wherein the magnetic recording medium has a center line average surface roughness of 0.1 to 4 nm for a cutoff value of 0.25 mm.

18. The magnetic recording medium according to claim 1, wherein the epoxy group introduced into the polyurethane resin is subjected to a curing reaction by heating the magnetic recording medium.

* * * * *